May 6, 1969 L. G. MALM ET AL 3,442,386
PLANT FOR TREATING SEWAGE WATER
Filed Jan. 24, 1966 Sheet 1 of 4

INVENTORS
Lars Gösta Malm
Hans Gunnar Hielborn

BY Watson, Cole, Grindle & Watson
ATTORNEYS

United States Patent Office 3,442,386
Patented May 6, 1969

3,442,386
PLANT FOR TREATING SEWAGE WATER
Lars G. Malm, Roslags-Nasby, and Hans G. Hilborn, Enskede, Sweden, assignors to Industrikemiska Aktiebolaget, a corporation of Sweden
Filed Jan. 24, 1966, Ser. No. 522,530
Claims priority, application Sweden, Jan. 25, 1965, 973/65
Int. Cl. C02c 1/36, 1/30, 1/10
U.S. Cl. 210—195                                3 Claims

ABSTRACT OF THE DISCLOSURE

A plant for treating sewage water is disclosed wherein there are a plurality of tanks each of which is identical in construction and accessory equipment. Each tank includes an inlet and outlet for the sewage water, an outlet for the sludge, a sludge scraper, and aeration means. All of the sewage water inlets and outlets are connected to a sewage water control center having diverter means whereby the flow of sewage water may be controlled between the tanks, and all of the sludge outlets are connected to a sludge control center having a pump and diverting means whereby the flow of sludge from each of the tanks may be controlled. With this arrangement the plant is made extremely flexible since flow of sewage water and sludge may be directed in any arbitrarily required sequence through the tanks.

---

Figure 1:
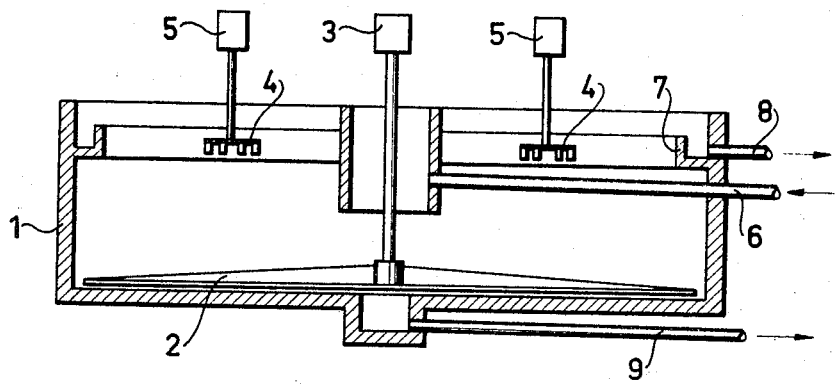

When purifying sewage water the so-called active sludge method is often used. This method involves aerating the sewage water in aerating tanks together with so-called active sludge. After the water has been aerated it undergoes a settling process whereby the active sludge is separated from the liquid. A large portion of the separated sludge is pumped back to the aerating tanks to be re-aerated together with the sewage water. A certain portion of the sludge, the so-called excess activated sludge, is led away, sometimes to a fermentation tank where the organic substances are oxidized with the assistance of micro-organisms. However, it is possible to operate the active sludge process so that the excess activated sludge is so oxidized that it is not necessary to subject the same to fermentation. This is possible, by either arranging for the excess active sludge to be aerated separately, so-called sludge aeration, or by carrying out the active sludge process in large aeration tanks with a very high concentration of sludge.

In conventional plants the aeration tanks usually comprise rectangular tanks provided with aerating members for supplying atmospheric oxygen and for mixing together the active sludge and the sewage water. Sludge aeration is carried out in tanks of a similar type. The aerating members are either constituted of pipes, jets or the like for injecting air into the fluid, or of mechanical means, e.g. turbine wheels, brushes etc., which bring the air into contact with the liquid.

Settling tanks are usually rectangular or circular in shape and are provided with sludge scrapers which convey the settled sludge to a sludge pocket from whence it can then be pumped back to the aerating tanks.

The large amount of water which runs into the tanks during rainy periods, or as a result of melting snow, is a great problem with respect to the above mentioned purification plants. On such occasions the settling tanks become over-loaded and a large portion of the sewage water is often shunted past the purifying works. In such cases it would often be convenient to be able to use the volume of the aerating tanks for settling purposes. In this way it would be possible to purify more waste-carrying water than is the case when a percentage of the water is shunted past the works. Further, an advantage would be gained in the fact that all the sewage water would have been at least desludged. Up to the present day, however, a practical solution to the problem has not been found.

Aerobic purifying works of the above mentioned type, i.e. without fermentation tanks, are usually used in smaller communities of between 100 and 5000 inhabitants. The sewage water from such communities has substantially the same composition as that from larger towns which means that heavy particles such as sand and coffee grains are also found in the sewage water. These large particles cause serious interruptions in the running of the plant due to the fact that, among other things, they settle on the bottom of the aerating tanks. In larger purifying works so-called sand traps are used in order to remove the heavier particles before the sewage water is introduced into the purifying plant proper. The sand trap consists of a special tank provided with bucket elevators, screw conveyors or the like, for removing the settled sand. Moreover the sand traps are nowadays often provided with aerating devices for obtaining the required speed of precipitation and oxygenation. In smaller plants such equipment is very expensive in relation to the capacity of the purifying works and it is therefore often impossible to equip such plants with special sand traps. Consequently the problem goes unsolved. The thickening of the excess activated sludge, which must always be removed from the purifying works, also constitutes a similar problem. In large plants it is economically possible to build separate tanks for thickening by settling. This is not possible in smaller plants since, like the sand traps, these separate tanks are very expensive in relation to the capacity of the purifying works. Thus the problem goes unsolved.

It is well known that a large number of purifying works become over-loaded earlier than anticipated. Similarly the sewage water is often of a different composition than that for which the purifying plant was designed. The reason can lie for example in the building of new factories or that an existing factory has started to manufacture a different line of goods resulting in changed sewage-water compositions. If the volumes of tanks already present in the plant could be re-arranged in a simple manner the extent to which the plant would have to be expanded to cope with the changing circumstances, might be considerably restricted. This, however, is very seldom possible since each of the various tanks is designed for its own purpose. Consequently it is necessary to carry out, from the technical aspect, an unnecessarily expensive re-building program. The active-sludge process may develop along unexpected lines. Thus a greater flexibility than found at present in the purifying works may be desirable. Such a development is already under-way and even now it is difficult, when designing a plant, to choose between the various methods of processing based on known experiences. In many cases it would be more desirable to design the plant so that it can be rapidly and simply converted so as to carry out the process in a new way, and so that it can be adapted according to developments.

By way of summary it can be said that hitherto in purifying plants of the above mentioned capacity it is impossible for economic reasons, to obtain a technical solution which can make these purifying plants comparable to larger, better equipped plants. This is particularly unfortunate since the smaller purifying works have a much smaller staff to assist in repair work and other difficulties which may occur. Many attempts have been made to simplify sand traps, thickening arrangements, etc., without considerably changing the nature of the problem. A solution of the above mentioned problem would therefore offer considerable technical and economic advantages, particularly if the solution of the problem enabled the tank and/or machinery equipment to be standardised.

The present invention relates to a plant which solves the above problem in an economic and technically simple manner. This is made possible by the fact that the plant is designed in the form of an optional number of unit-tanks provided with a sludge scraper rotating around the centre of the tanks, and provided with or fitted for means, which can be disposed above the rotating sludge scraper, for aerating the liquid content of the tank and that the unit-tanks, in a manner known per se, are connected to a diverting well or the like, having means for enabling optional passage of the sewage water and sludge through the tanks so that these alternatively can be used for aerating the sewage water and/or for return-sludge aeration and/or for separate aeration of the sludge obtained during purification and/or for settling and/or for sludge thickening. According to a modification of the invention the aerating members in the various unit-tanks are designed for alternative use in any of the other unit-tanks and said unit-tanks which, during normal operation, are used for settling processes are only provided with aerating members at those instances when the tank in question is to be used for aerating purposes.

The invention will be described below in connection with the accompanying drawings.

FIG. 1 shows a unit-tank 1 used in the plant, said tank being provided with a conventional sludge scraper 2 driven by a gear reduction motor 3. The aerating members 4 are disposed above the rotating scraper 2. Conventional aerating turbines have been shown as an example of the aerating members, the turbines being driven by the motors 5. The sewage water or sludge can be introduced through the conduit 6 and removed by means of the overflow channel 7 and outlet pipe 8. Sludge, sand and other settled material is drawn off through the pipe 9. It should be noted that the unit-tank can be constructed of well tested apparatus members known per se and that any type of scraper, aerator, sewage-duct etc. can be used when carrying out the inventive idea. The unit-tank is preferably made circular in shape for reasons concerning the structure and apparatus contained therein, although other shapes may also be employed.

The function of a unit-tank within a plant according to the invention will now be described in connection with the coupling diagrams specified in FIGS. 2a and b–4a and b.

Figure 2A:
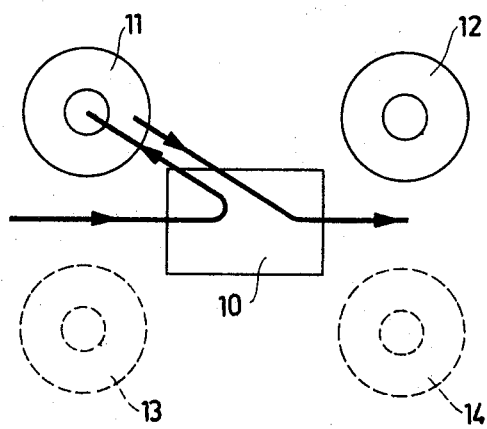
Figure 2B:
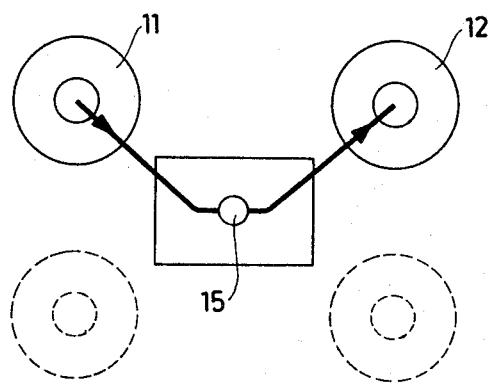

FIG. 2a shows the passage of the sewage water through a plant intended for low-grade purification. The plant comprises two unit-tanks 11 and 12 and a diverting well 10. Positions for two additional tanks 13 and 14 are arranged to facilitate conversion of the plant in the event of a change-over to biological purification or required increase in capacity of said plant. The sewage water enters the diverting well 10 which is assumed to be designed in the manner commonly known within sewage techniques. The diverting well 10 is connected to all of the sewage water inlets and outlets of all tanks and to all of the sludge outlets of all the tanks. A sludge pump 15 is also associated with the sludge outlets. The diverting well 10 includes means for diverting flow between the various inlets and outlets of the tanks. The sewage water is led away from the diverting well 10 into tank 11 via the tube 6. This unit-tank now functions as a common settling tank and the aerating members 4 are not active. The desludged sewage water is led away through the duct 7 and pipe 8 to the diverting well from where it is led away to the recipient. The settled sludge is removed by means of the scraper 2 and the pipe 9. FIG. 2b shows how the sludge is treated. Situated in the diverting well 10 is a sludge pump 15 by means of which the sludge from the unit-tank 11 can be passed to the unit-tank 12. Conveyance of the sludge from one tank to another is effected via the just mentioned pipe 9. The sludge is suitably introduced into the unit-tank 12 through the pipe 6. The unit-tank 12 now functions as a so-called sludge aerator and consequently the aerating members 4 are active.

If it should be required to move the sludge from the plant, the sludge can either be sucked up from the unit-tank 12 by a lorry equipped for the purpose or other similar means. The pump 15 can also be used for this purpose. Consequently no special device is necessary for removing the sludge. Further, it is possible to thicken the sludge in the unit-tank 12. The procedure is that some hours before the sludge is to be transported, the aerating members 4 in the tank are closed. The unit-tank 12 then functions as a conventional sludge thickener, the scraper 2 serving as an agitator used in common sludge thickeners. Thus, it is not necessary to provide separate sludge thickeners.

Figure 3B:
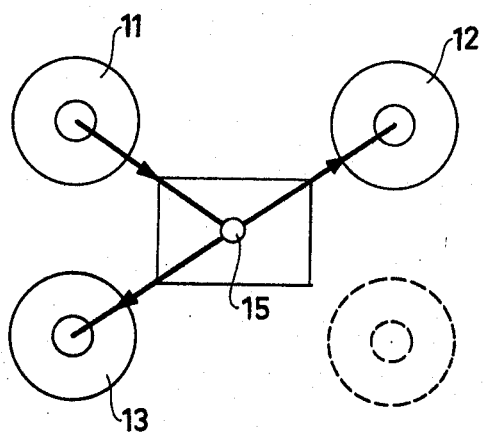
Figure 3A:
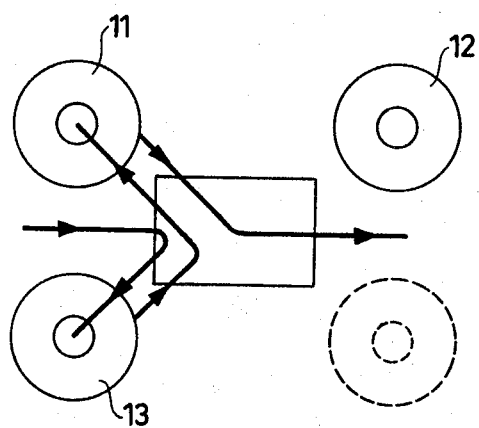

FIGS. 3a and 3b show, in a corresponding way, the same plant expanded for biological purification. This is possible by adding a further unit-tank 13 which can be connected to the diverting well 10 in a similar manner. The sewage water is now introduced first into the unit-tank 13 where it is aerated together with active sludge in a known manner. The sewage water is then led away together with the active sludge into the unit-tank 11 for subsequent passage to the recipient. The active sludge in the unit-tank 11 is then pumped by means of pump 15 back to the aerating tank, i.e. to the unit-tank 13.

The pump 15 thus serves as a conventional return-sludge pump but can, naturally, also be used for transferring so-called excess activated sludge to the sludge aerator i.e. the unit-tank 12. Separate sand traps are not required since heavier particles which settle in the aerating tank, i.e. unit-tank 13, can be removed to the sludge aerator or some other place by means of pump 15.

Figure 4A:
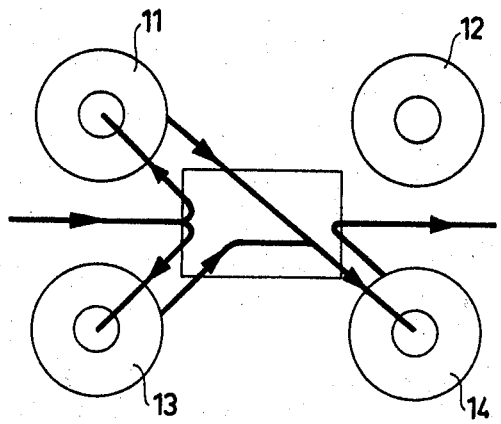
Figure 4B:
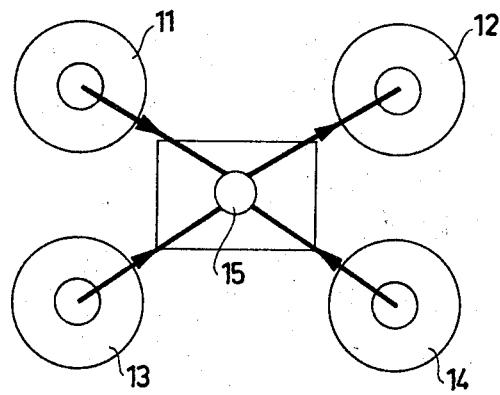

FIGS. 4a and 4b show the same plant provided with an additional unit-tank 14. It has been assumed in this case that a larger aerating volume is necessary, which is effected by operating two unit-tanks 11 and 13 in parallel as aerating tanks, whilst the unit-tank 14 is used as a settling tank. If a larger settling volume had been required instead it would naturally have been possible correspondingly to use, for example, the unit-tank 11 for aerating and the unit-tanks 13 and 14 for settling. FIG. 4b shows how sludge can be removed from the unit-tanks 11, 13 and 14 to the sludge aerator 12. Naturally the pump 15, as in FIG. 3, can be used as a return-sludge pump.

Obviously a plant according to the invention can be used for a very large number of processing schemes. The plant shall contain at least two unit-tanks in order to enable requisite treatment of the sewage water and sludge. The inventive idea cannot be realized by using one one unit-tank. Theoretically an unlimited number of unit-tanks can be combined to form a practically unlimited number of combinations. For example, if a plant according to FIG. 4a becomes over-loaded due to melting snow it would be possible if so desired, to use both the aerating tanks 11 and 13 for settling purposes during this period. Thus a plant is obtained which, although not biologically purifying the sewage water, can treat to a lower degree of efficiency an amount of sewage water which is 6–10 times the normal amount. The diverting well or diverting station can, as mentioned above, be of the conventional type. It is connected to the inlet and outlet conduit of all the unit-tanks and provided with requisite means for enabling the flow of the sewage water in arbitrary required sequences through all the unit-tanks, such as exemplified above. It can suitably include sludge pumps together with requisite conduits and diverting members for conveying the sludge in a required manner.

A plant according to the invention, however, is not only advantageous from the operational aspect or from the structural point of view. Due to the fact that the plant is based on single unit-tanks, it provides extraordinarily good possibilities of standardising not only the mechanical equipment but also the structural details, e.g.

by retaining a standard element for certain standardised sizes of unit-tank. Summarily it can be said it is possible by means of the invention to obtain a satisfactory technical and economic solution of the problem prevailing in present day purification works, even in plants of small capacity. The invention is nevertheless not restricted to small purification works but can be used in works of larger capacity whereby a greater flexibility in operation can be obtained. Naturally, it is also possible to supplement existing purification works with a plant according to the invention.

We claim:

1. A plant for treating sewage water comprising a plurality of essentially identical tanks and a control center, each of said tanks comprising an inlet and an outlet for the sewage water, a lower outlet for sludge, a sludge scraper, aeration means disposed above the sludge scraper for aerating the liquid contents of the tank and means for selectively controlling the operation of said sludge scraper and aeration means thereby permitting each of said tanks to alternatively perform the functions of aerating sewage water, aerating sludge, settling, and sludge thickening, and conduit means connecting each of said inlets and outlets with said control center, said control center comprising pump means for pumping sludge from any of said sludge outlets and means for diverting flow between said sewage water inlets and outlets and said sludge outlets through said pump means, whereby the sewage water and sludge may be directed in any arbitrarily required sequence through said tanks.

2. A plant as claimed in claim 1 wherein said control means controls the operation of the aeration means in each of said tanks whereby said aeration means may be operated only when a tank functions to aerate sewage water and sludge.

3. A plant as claimed in claim 1 wherein each of said tanks is circular and said sludge scraper is rotatably mounted in the center thereof.

References Cited

UNITED STATES PATENTS

| | | | |
|---|---|---|---|
| 2,089,162 | 8/1937 | Goudey et al. | 210—198 X |
| 2,137,966 | 11/1938 | Rankin | 210—201 |
| 2,394,413 | 2/1946 | Walker | 210—195 X |
| 2,477,815 | 8/1949 | Mallory | 210—195 X |
| 3,047,492 | 7/1962 | Gambrel | 210—195 X |
| 3,073,453 | 1/1963 | Gunetta et al. | 210—195 X |
| 3,152,982 | 10/1964 | Pagnotti | 210—528 X |
| 3,182,972 | 5/1965 | Alsop et al. | 210—219 X |
| 3,204,768 | 9/1965 | Daniel | 210—219 X |
| 3,282,436 | 11/1966 | Malm | 210—519 |

FOREIGN PATENTS

| | | |
|---|---|---|
| 23,469 | 1901 | Great Britain. |
| 28,631 | 1910 | Great Britain. |
| 627,636 | 8/1949 | Great Britain. |

REUBEN FRIEDMAN, *Primary Examiner.*

J. L. DE CESARE, *Assistant Examiner.*

U.S. Cl. X.R.

210—219, 528